United States Patent
Flynn et al.

(10) Patent No.: US 9,049,020 B2
(45) Date of Patent: Jun. 2, 2015

(54) CIRCUITRY TO FACILITATE TESTING OF SERIAL INTERFACES

(75) Inventors: James P. Flynn, Beaverton, OR (US); Junqi Hua, Portland, OR (US); John T. Stonick, Portland, OR (US); Daniel K. Weinlader, Allentown, PA (US); Jianping Wen, Beaverton, OR (US); Skye Wolfer, Hillsboro, OR (US); David A. Yokoyama-Martin, Portland, OR (US)

(73) Assignee: SYNOPSYS, INC., Mountain View, CA (US)

( * ) Notice: Subject to any disclaimer, the term of this patent is extended or adjusted under 35 U.S.C. 154(b) by 977 days.

(21) Appl. No.: 12/792,279

(22) Filed: Jun. 2, 2010

(65) Prior Publication Data
US 2011/0302452 A1 Dec. 8, 2011

(51) Int. Cl.
*G06F 1/04* (2006.01)
*H04L 1/24* (2006.01)
(52) U.S. Cl.
CPC ........................................ *H04L 1/243* (2013.01)
(58) Field of Classification Search
CPC ......................................................... G06F 1/04
USPC ........................................................ 713/600
See application file for complete search history.

(56) References Cited

U.S. PATENT DOCUMENTS

| 6,961,862 | B2 * | 11/2005 | Best et al. | 713/401 |
| 7,159,136 | B2 * | 1/2007 | Best et al. | 713/401 |
| 7,200,170 | B1 * | 4/2007 | Desandoli et al. | 375/224 |
| 7,902,886 | B2 * | 3/2011 | Pfaff et al. | 327/147 |

* cited by examiner

*Primary Examiner* — Kim Huynh
*Assistant Examiner* — Eric Chang
(74) *Attorney, Agent, or Firm* — Park, Vaughan, Fleming & Dowler LLP

(57) ABSTRACT

Circuitry to facilitate testing of serial interfaces is described. Specifically, some embodiments of the present invention facilitate testing the clock and data recovery functionality of a receiver. A serial interface can include a multiplying phase locked loop (MPLL) clock generator, a transmitter, and a receiver. The MPLL clock generator can generate a first clock signal and a second clock signal, and can vary a phase and/or frequency difference between the first clock signal and the second clock signal. During test, the transmitter and the receiver can be directly or capacitively coupled to each another. Specifically, during test, the serial interface can be configured so that the transmitter transmits data using the first clock signal, and the receiver receives data using the second clock signal. The clock and data recovery functionality of the receiver can be tested by comparing the transmitted data with the received data.

21 Claims, 4 Drawing Sheets

CIRCUITRY TO FACILITATE TESTING OF SERIAL INTERFACES

TECHNICAL FIELD

This disclosure is generally related to communication circuitry. More specifically, this disclosure relates to circuitry that facilitates performing a low-cost asynchronous test of a serial interface.

BACKGROUND

Related Art

Chips that have high-speed serial interfaces (e.g., 1 Gb/s and above) are increasingly used in a variety of devices and applications. During production testing of these chips, the high-speed serial interfaces need to be tested at normal operating speed. Although lab equipment which can generate and receive serial data at high speeds (e.g., 1 Gb/s and above) exists, for cost reasons such equipment is usually not part of the automated test equipment (ATE) used in production testing. To test the high speed serial interface during production testing, the ATE loops back the output of the serial interface transmitter to the input of the serial interface receiver. The transmitter then sends a pre-programmed pattern which the receiver can recognize. The serial interface passes the test if the pattern is received without errors.

In many applications that use high-speed serial interfaces to communicate over a link, the two endpoints of the link are clocked by different clock sources and thus have different frequencies. In addition, some serial data communication standards require the serial interface to vary its clock frequency (e.g., by using a spread spectrum clock) to reduce electromagnetic interference (EMI). As a result, the receiver of the serial interface usually has a clock and data recovery (CDR) function which allows it to track the varying clock frequency. A complete test of the serial interface would need to test the operation of this CDR function when it receives a data stream that was generated using a varying clock frequency. Unfortunately, conventional test equipment and methodologies do not properly test the CDR functionality of serial interfaces because all of the circuits in the serial interface are clocked at the exact same frequency.

SUMMARY

Some embodiments of the present invention provide serial interface devices which, during test, are capable of varying the phase and/or frequency difference between the clock signals that are supplied to the transmitter and the receiver. Note that the clock signals can be differential or single ended signals.

In some embodiments, an interface device can include a multiplying phase locked loop (MPLL) clock generator, a transmitter, and a receiver. The MPLL clock generator can be capable of generating a first clock signal and a second clock signal, and can be capable of varying the phase difference between the first clock signal and the second clock signal. Note that the frequency of one clock can be changed with respect to the frequency of another clock by continuously varying the phase difference between the two clocks. During test, the first clock signal can be supplied to the transmitter and the second clock signal can be supplied to the receiver. The data transmitted by the transmitter is looped back to the receiver during test, e.g., by directly or capacitively coupling the transmitter's output with the receiver's input. During test, the transmitter transmits data using the first clock signal, and the receiver receives the transmitted data using the second clock signal. Now, the phase and/or frequency difference between the first clock signal and the second clock signal can be varied to test the CDR circuitry in the receiver.

The MPLL clock generator can include a programmable phase mixer which is used for varying the phase and/or frequency difference between the first clock signal and the second clock signal. Specifically, the first clock signal can be generated from the programmable phase mixer's input, and the second clock signal can be generated from the programmable phase mixer's output. Alternatively, the first clock signal can be generated from the programmable phase mixer's output, and the second clock signal can be generated from the programmable phase mixer's input. Note that the phase and/or frequency difference between the programmable phase mixer's input and the programmable phase mixer's output can be varied by providing a control signal to the programmable phase mixer.

Specifically, the first clock signal and the second clock signal can be supplied as inputs to a multiplexer. The multiplexer's output can be supplied as a clock input to the transmitter. Next, the multiplexer can be configured to output the first clock signal during test, and output the second clock signal during normal operation. In this embodiment, the second clock signal is supplied to the receiver during both test and normal operation.

Alternatively, the multiplexer's output can be supplied as a clock input to the receiver. Next, the multiplexer can be configured to output the second clock signal during test, and output the first clock signal during normal operation. In this embodiment, the first clock signal is supplied to the transmitter during both test and normal operation.

Some embodiments provide a communication device which has multiple communication lanes, each of which has a transmitter and a receiver. The communication device can use a single MPLL clock generator to generate the two clocks for the transmitters and receivers in all of the lanes. Alternatively, multiple MPLL clock generators can be used, e.g., one MPLL clock generator for each communication lane.

DETAILED DESCRIPTION

During a typical test set up for a serial interface, the same clock is provided to the transmitter and the receiver. Unfortunately, this type of test set up does not test the receiver's CDR functionality to track a data stream that is generated using a clock at a different frequency, such as a spread spectrum clock. Some embodiments of the present invention enable different clock frequencies to be supplied to the transmitter and receiver, and in doing so, enable the receiver's CDR functionality to be tested properly.

Figure 1:
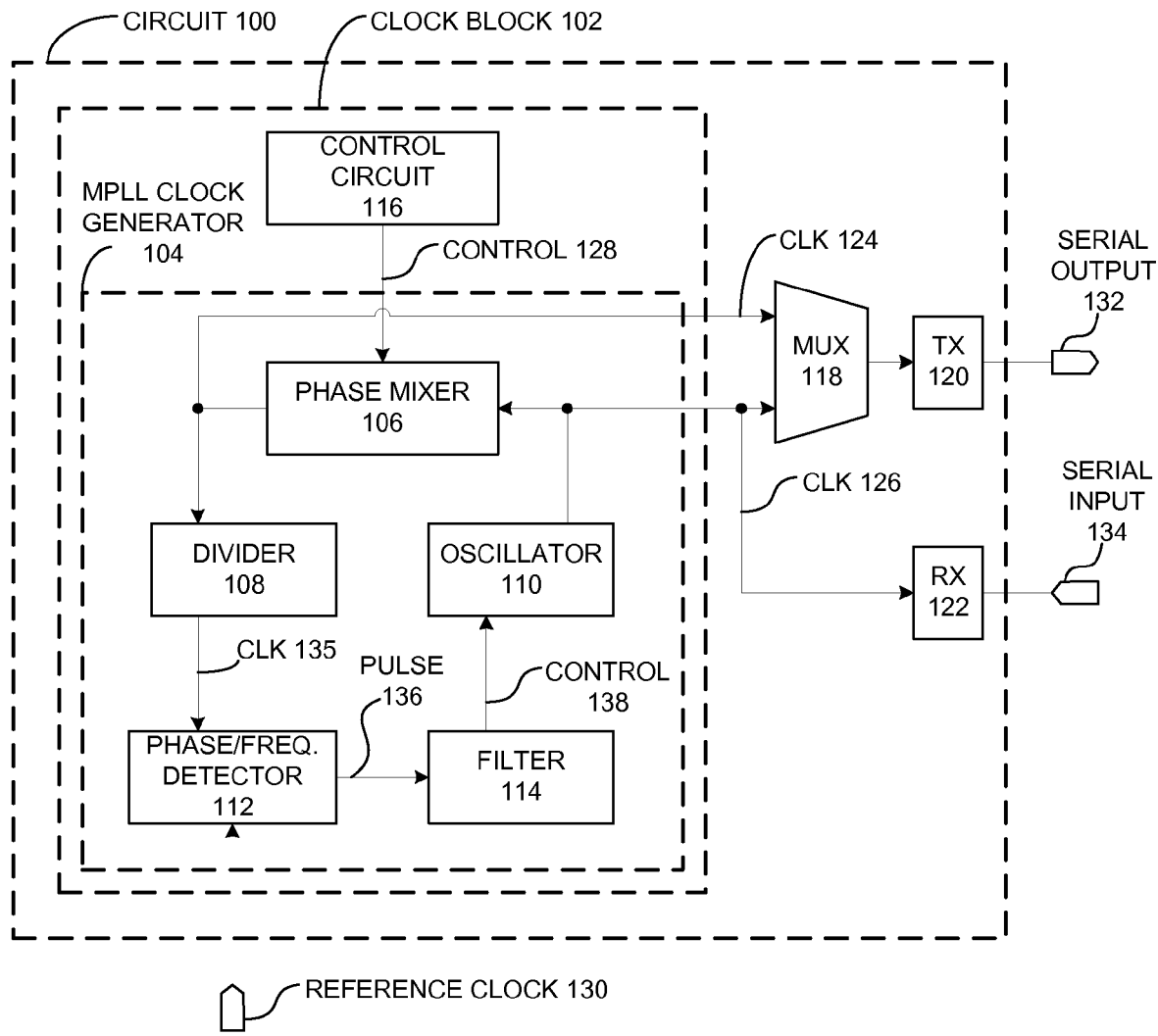
FIG. 1 illustrates a circuit which is capable of varying a phase and/or frequency difference between two clock signals in accordance with some embodiments of the present invention.

FIG. 1 illustrates a circuit which is capable of varying a phase and/or frequency difference between two clock signals in accordance with some embodiments of the present invention.

Circuit 100 can include clock block 102 which generates clock signals 124 and 126. Circuit 100 also includes transmitter 120, receiver 122, and multiplexer 118 whose output is coupled to the clock input for transmitter 120. Transmitter 120 and receiver 122 transmit and receive data through serial output 132 and serial input 134, respectively. Circuit 100 is capable of varying a phase and/or frequency difference between clock signal 126 and clock signal 124. Receiver 122 uses clock signal 126 during both test and normal operation. During normal operation, circuit 100 configures multiplexer 118 to provide clock signal 126 to the clock input of transmitter 120. During test, circuit 100 configures multiplexer 118 to provide clock signal 124 to the clock input of transmitter 120. The clock signals can be differential signals.

Alternatively, the output of multiplexer 118 can be coupled to the clock input of receiver 122 (this configuration is not shown in the figure). In this configuration, the clock input of transmitter 120 can be coupled to clock signal 126, and circuit 100 can configure multiplexer 118 during normal operation to provide clock signal 126 to the clock input of receiver 122. During test, circuit 100 can configure multiplexer 118 to provide clock signal 124 to the clock input of receiver 120.

Clock Block

Clock block 102 can include a multiplying phase locked loop (MPLL) clock generator 104, and can include a control circuit 116 which controls the phase and/or frequency difference between clock signal 124 and clock signal 126. Specifically, control circuit 116 generates control signal 128 which causes programmable phase mixer 106 to vary the phase and/or frequency difference between clock signals 124-126. MPLL clock generator 104 can receive reference clock 130. Note that the MPLL forces clock signal 124 to be locked to a fixed multiple of reference clock 130, whereas the phase and/or frequency of clock signal 126 can be modulated using control signal 128.

MPLL Clock Generator

MPLL clock generator 104 can include programmable phase mixer 106, divider 108, oscillator 110, phase/frequency detector 112, and filter 114.

Specifically, programmable phase mixer 106 can receive clock signal 126 and control signal 128 as input, and can generate clock signal 124 whose phase and/or frequency difference with respect to clock signal 126 can be modulated based at least on control signal 128. Hence, clock signal 126 may be referred to as a modulated clock signal. Clock signal 124, on the other hand, is locked to a fixed multiple of reference clock signal 130. Thus, clock signal 124 may be referred to as an unmodulated clock signal.

The frequency of reference clock 130 can be significantly lower than the clock frequency generated by oscillator 110. For example, reference clock signal 130 can have a clock frequency of approximately 100 MHz, and oscillator 110 can be configured to generate a clock frequency of approximately 2.5 GHz. Thus, to ensure that clock signal 124 can be frequency-locked to reference clock 130, divider 108 can be configured to generate a clock signal 135 whose frequency is an integral fraction of that of clock signal 124.

During operation, phase/frequency detector 112 can compare the phase and/or frequency of clock signal 135 and reference clock 130, and can generate a signal, e.g., pulse signal 136, which is indicative of a phase and/or frequency difference between clock signal 135 and reference clock 130.

Filter 114 can convert the output of the phase/frequency detector 112, e.g., pulse signal 136, into a control signal 138 which can be supplied to oscillator 110 to generate clock signal 126 so that the frequency and/or phase of clock signal 135 matches that of reference clock 130. Specifically, filter 114 can output a voltage level based on pulse signal 136, and oscillator 110 can be a voltage-controlled oscillator which varies its output frequency based on the voltage of control signal 138.

Programmable Phase Mixer

Programmable phase mixer 106 takes clock signal 126 as input, and generates clock signal 124 by varying the phase of clock signal 126 based at least on control signal 128. Specifically, programmable phase mixer 106 can add a phase delay to clock signal 126 based at least on the control signal 126.

Figure 2:
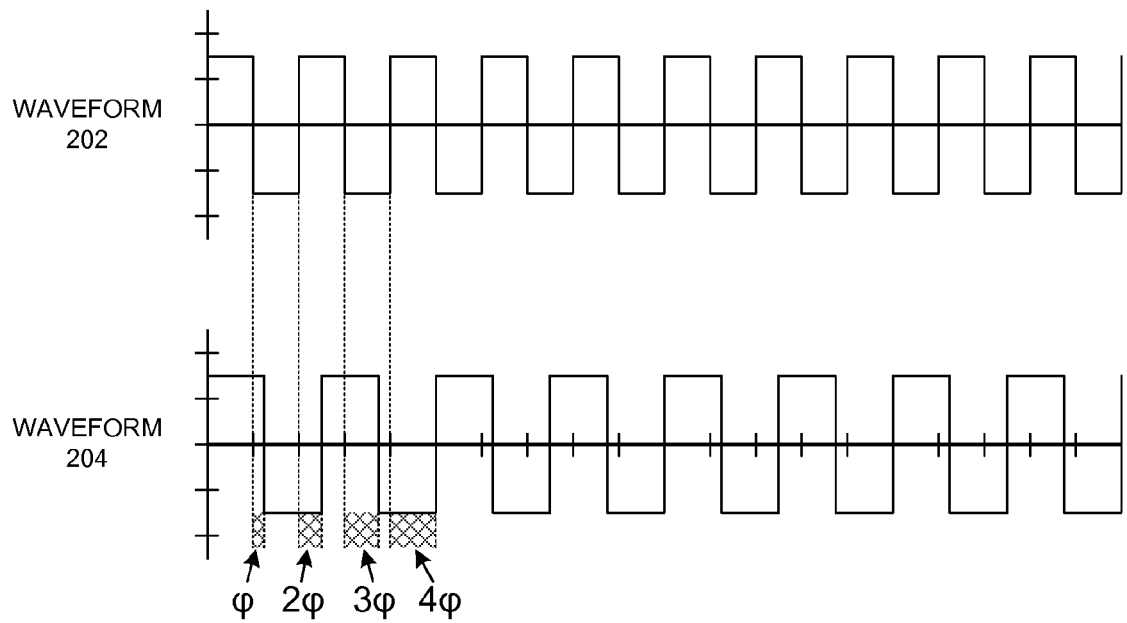
FIG. 2 illustrates a programmable phase mixer in accordance with some embodiments of the present invention.

FIG. 2 illustrates a programmable phase mixer in accordance with some embodiments of the present invention.

A programmable phase mixer can apply a programmable amount of phase delay to an input signal to produce an output signal that has a different phase and/or frequency. For example, waveform 202 illustrates an idealized input signal (e.g., an idealized version of clock signal 126) of a programmable phase mixer, and waveform 204 illustrates an idealized output signal (e.g., an idealized version of clock signal 124) of a programmable phase mixer.

As shown in FIG. 2, a programmable phase mixer can increase the phase delay by $\phi$ at each clock edge of waveform 202 to produce waveform 204. Waveform 204 is now a periodic signal that has a different period and thus different frequency than waveform 202. Note that, due to the fact that the operation of adding phase is mathematically a periodic function, the phase mixer can add additional phase to its output indefinitely. In some embodiments, the phase mixer may add an aggregate phase delay after a certain number of clock edges in waveform 202. For example, instead of increasing the phase delay by $\phi$ at each clock edge of waveform 202, the programmable phase mixer may increase the phase delay by $2\phi$ at every other clock edge of waveform 202. In this manner, programmable phase mixer 106 can generate an output clock signal that has a different frequency from the input clock signal. FIG. 2 has been presented for illustration purposes only and is not intended to limit the present invention. In general, a programmable phase mixer can be any circuit that can modify the phase of an input signal to produce an output signal whose phase and/or frequency is different from the input signal.

Serial Interface Test

Some high-speed serial-interface standards require transmitters to vary their clock frequency for EMI considerations. Therefore, it is important that the clock and data recovery (CDR) function in a receiver module (e.g., receiver 122 illustrated in FIG. 1) is capable of tracking this varying frequency.

Embodiments of the present invention facilitate testing the CDR function of a receiver module without requiring expensive equipment that provides separate clock signals to the transmitter and receiver.

Figure 3:
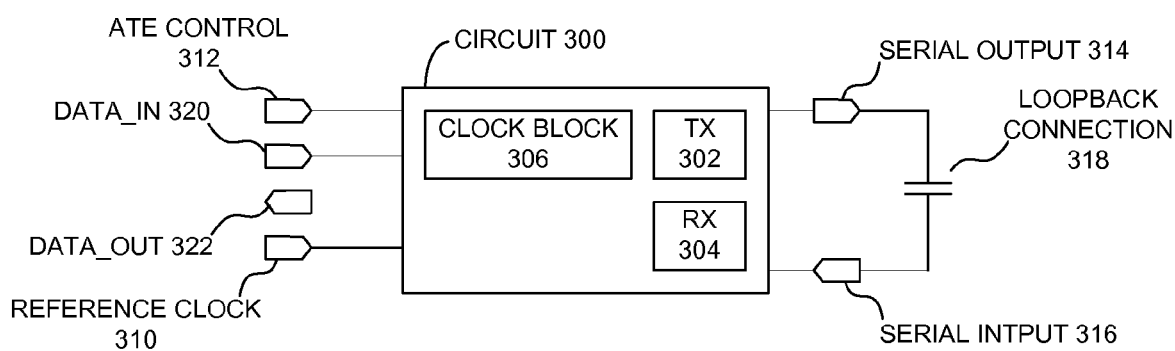
FIG. 3 illustrates a circuit in a serial interface in accordance with some embodiments of the present invention.

FIG. 3 illustrates a circuit in a serial interface in accordance with some embodiments of the present invention.

Circuit 300 can be part of a serial interface device (some of the details of circuit 300 have not been shown for the sake of clarity; for example, circuit 300 can be similar to circuit 100 shown in FIG. 1). Circuit 300 can include a transmitter 302, a receiver 304, and a clock block 306 (which can include a programmable phase mixer). Further, circuit 300 can receive a reference clock signal 310, an ATE control signal 312, and a data_in signal 320 as input.

Reference clock signal 310 provides a stable clock signal, which can be used to generate a modulated and unmodulated clock signal. Serial output signal 314 of circuit 300 can be coupled to a serial input signal 316 via a loopback connection 318. Loopback connection 318 can include a capacitor which isolates the bias of the serial output 314 and serial input 316.

ATE control signal 312 can configure clock block 306 to produce both modulated and unmodulated clock signals, thereby producing two clock signals at different frequencies. Further, ATE control signal 312 can configure circuit 300 (e.g., by providing the appropriate control signal to a multiplexer) so that transmitter 302 and receiver 304 use different clock signals, e.g., the transmitter uses the unmodulated clock signal and the receiver uses the modulated clock signal or the transmitter uses the modulated clock signal and the receiver uses the unmodulated clock signal.

During test, a test system can provide circuit 300 with test data via data_in signal 320. Transmitter 302 serializes the test data, and transmits the test data via serial output signal 314 using the unmodulated clock signal. Furthermore, receiver 304 receives the test data via serial input signal 316, and uses the modulated clock signal to track the frequency of serial input signal 316 while receiving the serial data. The test system can then retrieve the received data via data_out signal 322.

To determine whether the CDR function within receiver 304 is functioning properly, the test system can compare the original test data to the retrieved data. If the retrieved data matches the original test data, then the system can determine that the CDR function is functioning properly. Otherwise, the test system can determine that the CDR function may not be functioning properly.

Figure 4:
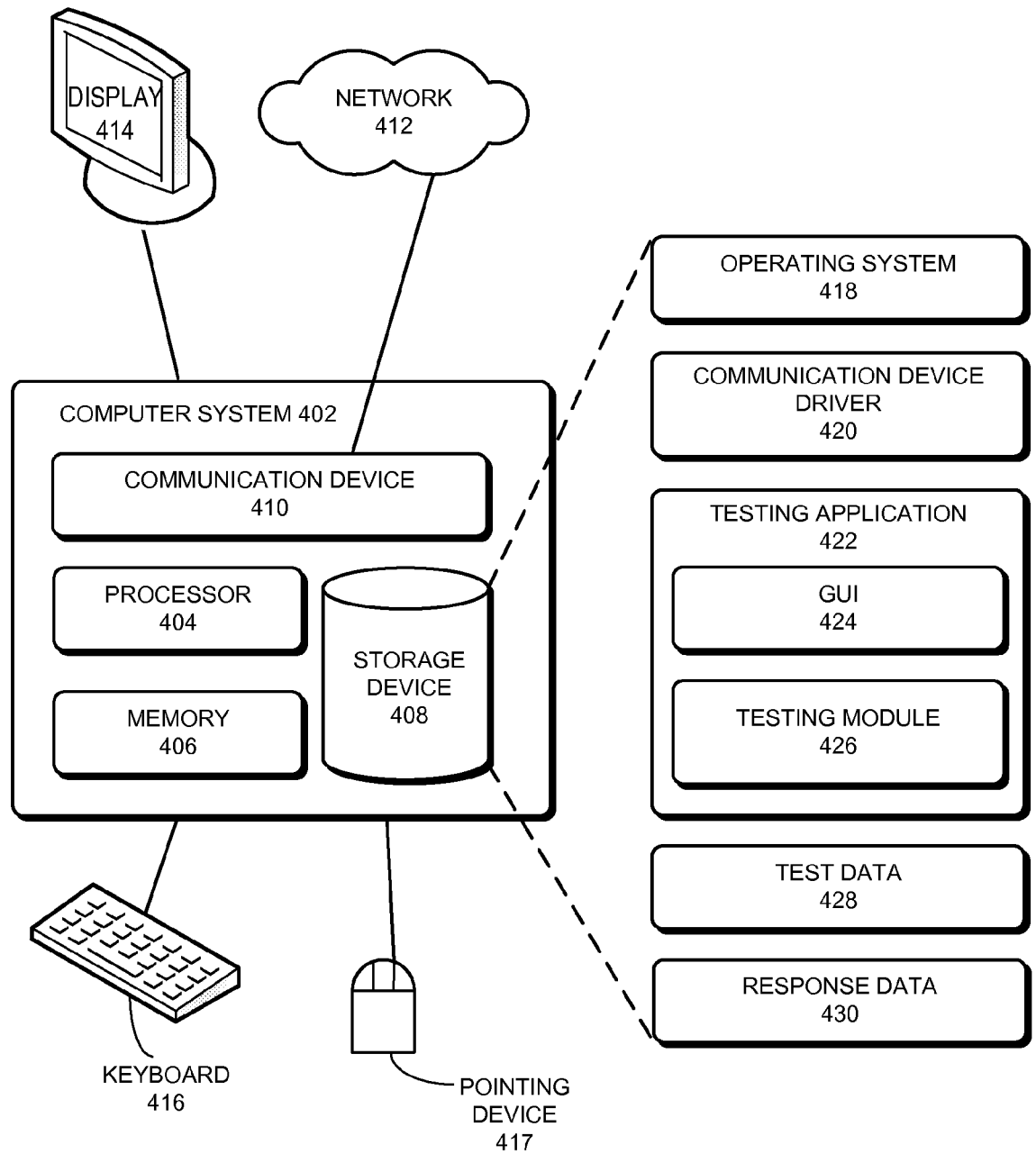
FIG. 4 illustrates a computer system in accordance with some embodiments of the present invention.

FIG. 4 illustrates a computer system in accordance with some embodiments of the present invention.

A computer or computer system can generally be any system that can perform computations. Specifically, a computer can be a microprocessor-based system which may include multiple processing cores, a network-processor-based system, a digital-signal-processor-based system, a portable computing device (e.g., a smart phone), a personal organizer, a distributed-computing-platform-based system, or any other computing system now known or later developed.

Computer system 402 includes a processor 404, a memory 406, a storage device 408, and a communication device 410. Computer system 402 can be coupled to a display device 414, a keyboard 416, and a pointing device 417. Furthermore, computer system 402 can use communication device 410 to communicate with other computers, storage devices, or electronic devices via a network 412. A network can generally be any mechanism and/or medium that enables communication between two or more communication interfaces. For example, network 412 can be a loopback connection. Storage device 408 can store operating system 418, a communication device driver 420, testing application 422, and test data 428, and response data 430. Computer system 402 can perform a test on communication device 410.

Communication device driver 420 can include instructions for configuring a transmitter in communication device 410 to transmit data (e.g., test data 428), and for retrieving data (e.g., response data 430) from a receiver in communication device 410.

Testing application 422 can include instructions, which when executed by computer system 402 can cause computer system 402 to perform methods and/or processes described in this disclosure. Specifically, testing application 422 can include a graphical user interface (GUI) 424 and testing module 426 which may include instructions for processing test data 428. Specifically, testing module 426 can provide communication device driver 420 with test data 428, which is transmitted by the transmitter in communication device 410. Testing module 426 can also receive response data 430 from communication device driver 420, which includes data received by the receiver in communication device 410.

Moreover, testing application 422 can compare test data 428 to response data 430 to determine whether the CDR function within the receiver in communication device 410 is functioning properly. If response data 430 matches test data 428, then testing application 422 can determine that the CDR function is functioning properly. Otherwise, testing application 422 can determine that the CDR function may not be functioning properly.

Figure 5:
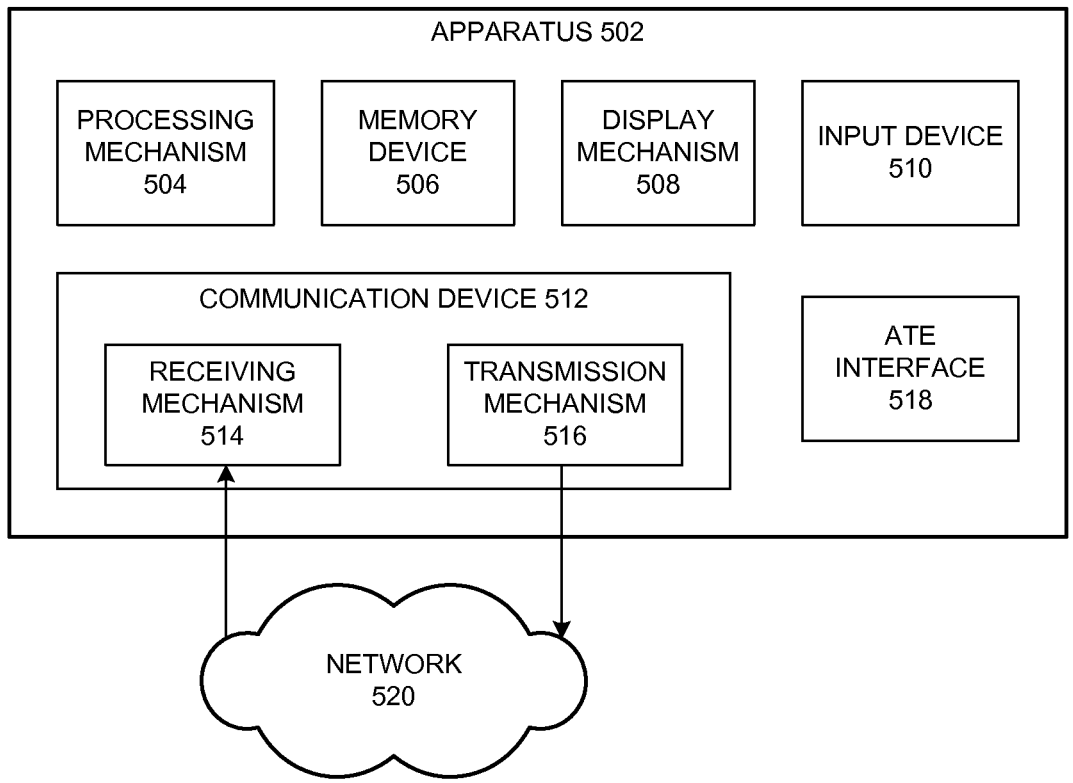
FIG. 5 illustrates an apparatus in accordance with some embodiments of the present invention.

FIG. 5 illustrates an apparatus in accordance with some embodiments of the present invention.

Apparatus 502 can comprise a plurality of mechanisms which may communicate with one another via a wired or wireless communication channel. Apparatus 502 may be realized using one or more integrated circuits, and apparatus 502 may include fewer or more mechanisms than those shown in FIG. 5. Further, apparatus 502 may be integrated in a computer system, or it may be realized as a separate device which is capable of communicating with other computer systems and/or devices. Specifically, apparatus 502 can comprise a processing mechanism 504, a memory device 506, a display mechanism 508, an input device 510, a communication device 512, and an ATE interface 518.

During operation, processing mechanism 504 may be configured to read instructions and/or data from memory device 506, and process the instructions and/or data to produce a result. Moreover, processing mechanism 504 can accept input data from a user via input device 510, and can present the result to the user via display mechanism 508 and/or store the result in memory device 506. Further, processing mechanism 504 can use communication device 512 to communicate data via a transmission mechanism 516, and to receive data via a receiving mechanism 514. ATE interface 518 can communicate with automated test equipment to test any mechanism in apparatus 502, including communication device 512. Note that communication device 512 can be coupled to a network 520, such as the Internet.

During test, transmission mechanism 516 and receiving mechanism 514 can be coupled together via a loopback connection. Apparatus 502 can provide communication device 512 with test data, which is transmitted by transmission mechanism 516. Apparatus 502 can receive response data from communication device 512, which includes data received by receiving mechanism 514.

During test, apparatus 502 can compare the test data to the response data to determine whether the CDR function within receiving mechanism 514 is functioning properly. If the response data matches the test data, then apparatus 502 can determine that the CDR function is functioning properly. Otherwise, apparatus 502 can determine that the CDR function may not be functioning properly.

Figure 6:
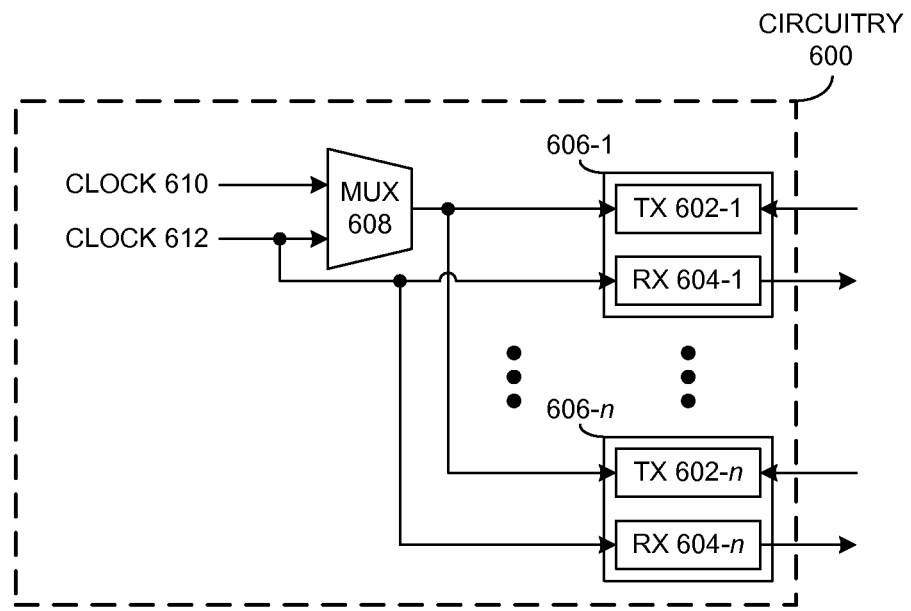
FIG. 6 illustrates communication circuitry with multiple communication lanes in accordance with some embodiments of the present invention.

FIG. 6 illustrates communication circuitry with multiple communication lanes in accordance with some embodiments of the present invention.

A communication device can have multiple communication lanes. Each communication lane can include a transmitter and a receiver. The communication device can use a single MPLL clock generator to generate the clocks for the transmitters and receivers. Alternatively, the communication device can use multiple MPLL clock generators, e.g., one MPLL clock generator for each communication lane.

Communication circuitry 600 illustrates communication lanes 606-1 through 606-n. Each communication lane can include a transmitter and a receiver. For example, communication lane 606-1 includes transmitter 602-1 and receiver 604-1, and communication lane 606-n includes transmitter 602-n and receiver 604-n. An MPLL (not shown) can generate clocks 610 and 612, which can be provided as inputs to multiplexer 608. Clock 612 can be supplied as a clock input to the receivers, and the output of multiplexer 608 can be supplied as a clock input to the transmitters. During test, multiplexer 608 can be configured to output clock 610 to the transmitters. During normal operation, multiplexer 608 can be configured to output clock 612 to the transmitters.

Conclusion

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a non-transitory computer-readable storage medium and/or a hardware module and/or hardware apparatus. A non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A serial interface, comprising:
a multiplying phase locked loop (MPLL) clock generator to generate a first clock signal and a second clock signal, wherein the MPLL comprises a programmable phase mixer to vary the phase difference between the first clock signal and the second clock signal based on a control signal;
a transmitter which, during test, transmits data using the first clock signal;
a receiver which, during test, receives data using the second clock signal;
wherein, during test, the data transmitted by the transmitter is looped back to the receiver; and
wherein, during test, the control signal is used to vary the phase difference between the first clock signal and the second clock signal while the transmitter is transmitting data using the first clock signal and the receiver is receiving data using the second clock signal.

2. The serial interface of claim 1, wherein the data transmitted by the transmitter is looped back to the receiver by capacitively coupling the transmitter's output with the receiver's input.

3. The serial interface of claim 1, wherein the first clock signal is generated from the programmable phase mixer's input, and wherein the second clock signal is generated from the programmable phase mixer's output.

4. The serial interface of claim 1, wherein the first clock signal is generated from the programmable phase mixer's output, and wherein the second clock signal is generated from the programmable phase mixer's input.

5. The serial interface of claim 1, wherein the serial interface comprises a multiplexer, wherein the first clock signal and the second clock signal are supplied as inputs to the multiplexer, wherein the multiplexer's output is supplied as a clock input to the transmitter, wherein the multiplexer outputs the first clock signal during test, and wherein the multiplexer outputs the second clock signal during normal operation.

6. The serial interface of claim 1, wherein the serial interface comprises a multiplexer, wherein the first clock signal and the second clock signal are supplied as inputs to the multiplexer, wherein the multiplexer's output is supplied as a clock input to the receiver, wherein the multiplexer outputs the second clock signal during test, and wherein the multiplexer outputs the first clock signal during normal operation.

7. The serial interface of claim 1, wherein the first clock signal and the second clock signal are differential signals.

8. A computer system, comprising:
a processor;
a memory; and
a serial interface, comprising:
a multiplying phase locked loop (MPLL) clock generator to generate a first clock signal and a second clock signal, wherein the MPLL comprises a programmable phase mixer to vary the phase difference between the first clock signal and the second clock signal based on a control signal;
a transmitter which, during test, transmits data using the first clock signal;
a receiver which, during test, receives data using the second clock signal;
wherein, during test, the data transmitted by the transmitter is looped back to the receiver; and
wherein, during test, the control signal is used to vary the phase difference between the first clock signal and the second clock signal while the transmitter is transmitting data using the first clock signal and the receiver is receiving data using the second clock signal.

9. The computer system of claim 8, wherein the data transmitted by the transmitter is looped back to the receiver by capacitively coupling the transmitter's output with the receiver's input.

10. The computer system of claim 8, wherein the first clock signal is generated from the programmable phase mixer's input, and wherein the second clock signal is generated from the programmable phase mixer's output.

11. The computer system of claim 8, wherein the first clock signal is generated from the programmable phase mixer's output, and wherein the second clock signal is generated from the programmable phase mixer's input.

12. The computer system of claim 8, wherein the serial interface comprises a multiplexer, wherein the first clock signal and the second clock signal are supplied as inputs to the multiplexer, wherein the multiplexer's output is supplied as a clock input to the transmitter, wherein the multiplexer outputs the first clock signal during test, and wherein the multiplexer outputs the second clock signal during normal operation.

13. The computer system of claim 8, wherein the serial interface comprises a multiplexer, wherein the first clock signal and the second clock signal are supplied as inputs to the multiplexer, wherein the multiplexer's output is supplied as a clock input to the receiver, wherein the multiplexer outputs the second clock signal during test, and wherein the multiplexer outputs the first clock signal during normal operation.

14. The computer system of claim 8, wherein the first clock signal and the second clock signal are differential signals.

15. A communication device, comprising:
   a multiplying phase locked loop (MPLL) clock generator to generate a first clock signal and a second clock signal, wherein the MPLL comprises a programmable phase mixer to vary the phase difference between the first clock signal and the second clock signal based on a control signal; and
   multiple communication lanes, wherein each communication lane includes:
      a transmitter which, during test, transmits data using the first clock signal;
      a receiver which, during test, receives data using the second clock signal;
      wherein, during test, the data transmitted by the transmitter is looped back to the receiver; and
      wherein, during test, the control signal is used to vary the phase difference between the first clock signal and the second clock signal while the transmitter is transmitting data using the first clock signal and the receiver is receiving data using the second clock signal.

16. The communication device of claim 15, wherein the data transmitted by the transmitter is looped back to the receiver by capacitively coupling the transmitter's output with the receiver's input.

17. The communication device of claim 15, wherein the first clock signal is generated from the programmable phase mixer's input, and wherein the second clock signal is generated from the programmable phase mixer's output.

18. The communication device of claim 15, wherein the first clock signal is generated from the programmable phase mixer's output, and wherein the second clock signal is generated from the programmable phase mixer's input.

19. The communication device of claim 15, further comprising a multiplexer, wherein the first clock signal and the second clock signal are supplied as inputs to the multiplexer, wherein the multiplexer's output is supplied as a clock input to the transmitter in each communication lane, wherein the multiplexer outputs the first clock signal during test, and wherein the multiplexer outputs the second clock signal during normal operation.

20. The communication device of claim 15, further comprising a multiplexer, wherein the first clock signal and the second clock signal are supplied as inputs to the multiplexer, wherein the multiplexer's output is supplied as a clock input to the receiver in each communication lane, wherein the multiplexer outputs the second clock signal during test, and wherein the multiplexer outputs the first clock signal during normal operation.

21. The communication device of claim 15, wherein the first clock signal and the second clock signal are differential signals.

* * * * *